(12) United States Patent
McDougall et al.

(10) Patent No.: US 11,226,995 B2
(45) Date of Patent: Jan. 18, 2022

(54) GENERATING BUSINESS INTELLIGENCE GEOSPATIAL ELEMENTS

(71) Applicant: International Business Machines Corporation, Armonk, NY (US)

(72) Inventors: Steven R. McDougall, Kanata (CA); Craig A. Statchuk, North Gower (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/939,972

(22) Filed: Jul. 11, 2013

(65) Prior Publication Data
US 2014/0280064 A1 Sep. 18, 2014

Related U.S. Application Data

(60) Provisional application No. 61/802,203, filed on Mar. 15, 2013.

(51) Int. Cl.
*G06F 16/29* (2019.01)
*G06N 5/04* (2006.01)
*H04L 29/06* (2006.01)

(52) U.S. Cl.
CPC .............. *G06F 16/29* (2019.01); *G06N 5/04* (2013.01); *H04L 67/42* (2013.01)

(58) Field of Classification Search
CPC ... G06F 17/30241; G06F 16/29; H04L 67/42; G06N 5/04
See application file for complete search history.

(56) References Cited

U.S. PATENT DOCUMENTS

| 7,567,262 | B1 | 7/2009 | Clemens et al. |
| 8,200,676 | B2 | 6/2012 | Frank |
| 2005/0285876 | A1* | 12/2005 | Balaga ................. G06T 17/05 345/629 |
| 2008/0059889 | A1* | 3/2008 | Parker ............. G06F 17/30241 715/748 |
| 2008/0097731 | A1 | 4/2008 | Lanes et al. |
| 2009/0100007 | A1* | 4/2009 | Campbell ........... G06F 16/9537 |

(Continued)

OTHER PUBLICATIONS

Bedard et al. "Spatial On-Line Analytical Processing (SOLAP): Concepts, Architectures and Solutions from a Geomatics Engineering Perspective", Data Warehouses and OLAP: Concepts Architectures and Solutions, EDA Group, 2006, 16 pgs.

(Continued)

*Primary Examiner* — Mariela Reyes
*Assistant Examiner* — James E Heffern
(74) *Attorney, Agent, or Firm* — Stephen J. Walder, Jr.; Alexander G. Jochym

(57) ABSTRACT

Techniques are described for creating geospatial elements based on geographical data. In one example, a method for creating geospatial elements based on geographical data includes collecting one or more geographical indicators comprised in a set of operational data, the geographical indicators indicating one or more geographical areas. The method further includes collecting, from a set of geographical data, geospatial data associated with the one or more geographical areas indicated by the one or more geographical indicators. The method further includes generating one or more aggregated geospatial elements based on the one or more geographical indicators and the geospatial data.

19 Claims, 6 Drawing Sheets

(56) References Cited

U.S. PATENT DOCUMENTS

| | | | |
|---|---|---|---|
| 2011/0157220 A1 | 6/2011 | Kim et al. | |
| 2011/0264529 A1* | 10/2011 | Conlan | G01S 19/19 |
| | | | 705/14.63 |
| 2011/0270833 A1 | 11/2011 | von Kaenel et al. | |
| 2012/0038633 A1 | 2/2012 | Clark et al. | |
| 2012/0054174 A1* | 3/2012 | Gagnier et al. | 707/714 |
| 2012/0089920 A1 | 4/2012 | Eick | |
| 2013/0080504 A1* | 3/2013 | Maurer et al. | 709/203 |

OTHER PUBLICATIONS

Mansmann, Svetlana and Marc H. Scholl, "Exploring OLAP Aggregates with Hierarchical Visualization Techniques", SAC '07, Mar. 11-15, 2007, Seoul, Korea, ACM 2007, pp. 1067-1073.

Mansmann, Florian and Svetlana Vinnik "Interactive Exploration of Data Traffic with Hierarchical Network Maps", IEEE Transactions on Visualization and Computer Graphics, vol. 12, No. 6, Nov.-Dec. 2006, pp. 1440-1449.

Martino et al. "Integrating Google Earth within OLAP Tools for Multidimensional Exploration and Analysis of Spatial Data", ICEIS 2009, LNBIP 24, Springer-Verlag Berlin Heidelberg 2009, p. 940-951.

Scotch, Matthew and Bambang Parmanto "SOVAT: Spatial OLAP Visualization and Analysis Tool", Proceedings of the 38th Hawaii International Conference on System Sciences, IEEE, 2005, 7pgs.

Final Office Action from U.S. Appl. No. 14/489,303, dated Jan. 9, 2017, 39 pp.

Office Action from U.S. Appl. No. 14/489,303, dated May 19, 2016, 34 pp.

Response to the Office Action dated May 19, 2016, from U.S. Appl. No. 14/489,303, filed Aug. 17, 2016, 14 pp.

Amendment in Response to Final Office Action dated Jan. 9, 2017, from U.S. Appl. No. 14/489,303, filed Apr. 10, 2017, 10 pp.

Office Action from U.S. Appl. No. 14/489,303, dated Jun. 14, 2018, 44 pp.

Final Office Action from U.S. Appl. No. 14/489,303, dated Dec. 31, 2018, 42 pp.

Response to Office Action dated Jun. 14, 2018 from U.S. Appl. No. 14/489,303, filed Sep. 11, 2018, 15 pp.

Amendment in Response to Final Office Action dated Dec. 31, 2018, from U.S. Appl. No. 14/489,303, filed Mar. 28, 2019, 17 pp.

\* cited by examiner

GENERATING BUSINESS INTELLIGENCE GEOSPATIAL ELEMENTS

This application claims priority to provisional application Ser. No. 61/802,203, filed on Mar. 15, 2013, entitled GEOSPATIAL ELEMENT CREATION, the entire content of which is incorporated by reference herein.

TECHNICAL FIELD

The invention relates to business intelligence systems, and more particularly, to generating geospatial elements for business intelligence systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by many users. Using the results of these calculations, the system may generate reports for review by higher management. Often these complex systems make use of multidimensional data sources that organize and manipulate the tremendous volume of data using data structures referred to as data cubes. Each data cube, for example, includes a plurality of hierarchical dimensions having levels and members for storing the multidimensional data.

Business intelligence (BI) systems may be used to provide insights into such collections of enterprise data. Many collections of enterprise data include geographical elements. BI systems may be used to display or visualize BI data in a way that involves geographical divisions, with geographical aspects of business data represented in maps. Creating maps and map overlay visualization elements is typically a labor-intensive activity that typically requires an author with specialized Geographic Information System (GIS) training and skills.

Base maps may provide graphical location, place, and satellite images that may be shown in applications and web pages. Overlay images may be placed in superposition with base maps with varying levels of opacity or transparency to show areas such as individual states, provinces, counties, cities, postal codes, municipal districts, or any shapes with definable boundaries that may be expressed as polygon outlines or other shape representations.

SUMMARY

In general, examples disclosed herein are directed to techniques for creating geospatial elements based on geographical data.

In one example, a method for creating geospatial elements based on geographical data includes collecting, with one or more computing devices, one or more geographical indicators comprised in a set of operational data, the geographical indicators indicating one or more geographical areas. The method further includes collecting, with the one or more computing devices, from a set of geographical data, geospatial data associated with the one or more geographical areas indicated by the one or more geographical indicators. The method further includes generating, with the one or more computing devices, one or more aggregated geospatial elements based on the one or more geographical indicators and the geospatial data.

In another example, a computer system for creating geospatial elements based on geographical data includes one or more processors, one or more computer-readable memories, and one or more computer-readable, tangible storage devices. The computer system further includes program instructions, stored on at least one of the one or more storage devices for execution by at least one of the one or more processors via at least one of the one or more memories, to collect one or more geographical indicators comprised in a set of operational data, the geographical indicators indicating one or more geographical areas. The computer system further includes program instructions, stored on at least one of the one or more storage devices for execution by at least one of the one or more processors via at least one of the one or more memories, to collect, from a set of geographical data, geospatial data associated with the one or more geographical areas indicated by the one or more geographical indicators. The computer system further includes program instructions, stored on at least one of the one or more storage devices for execution by at least one of the one or more processors via at least one of the one or more memories, to generate one or more aggregated geospatial elements based on the one or more geographical indicators and the geospatial data.

In another example, a computer program product for creating geospatial elements based on geographical data includes a computer-readable storage medium having program code embodied therewith. The program code is executable by a computing device to collect one or more geographical indicators comprised in a set of operational data, the geographical indicators indicating one or more geographical areas. The program code is further executable by a computing device to collect, from a set of geographical data, geospatial data associated with the one or more geographical areas indicated by the one or more geographical indicators. The program code is further executable by a computing device to generate one or more aggregated geospatial elements based on the one or more geographical indicators and the geospatial data.

The details of one or more embodiments of the invention are set forth in the accompanying drawings and the description below. Other features, objects, and advantages of the invention will be apparent from the description and drawings, and from the claims.

DETAILED DESCRIPTION

Various examples are disclosed herein for creating geospatial elements based on geographical data. In various examples, a geospatial element creation system may automatically generate one or more aggregated geospatial elements based on the one or more geographical indicators and the geospatial data. The aggregated geospatial elements may provide end users with high-level analysis and insight into the data.

Figure 1:
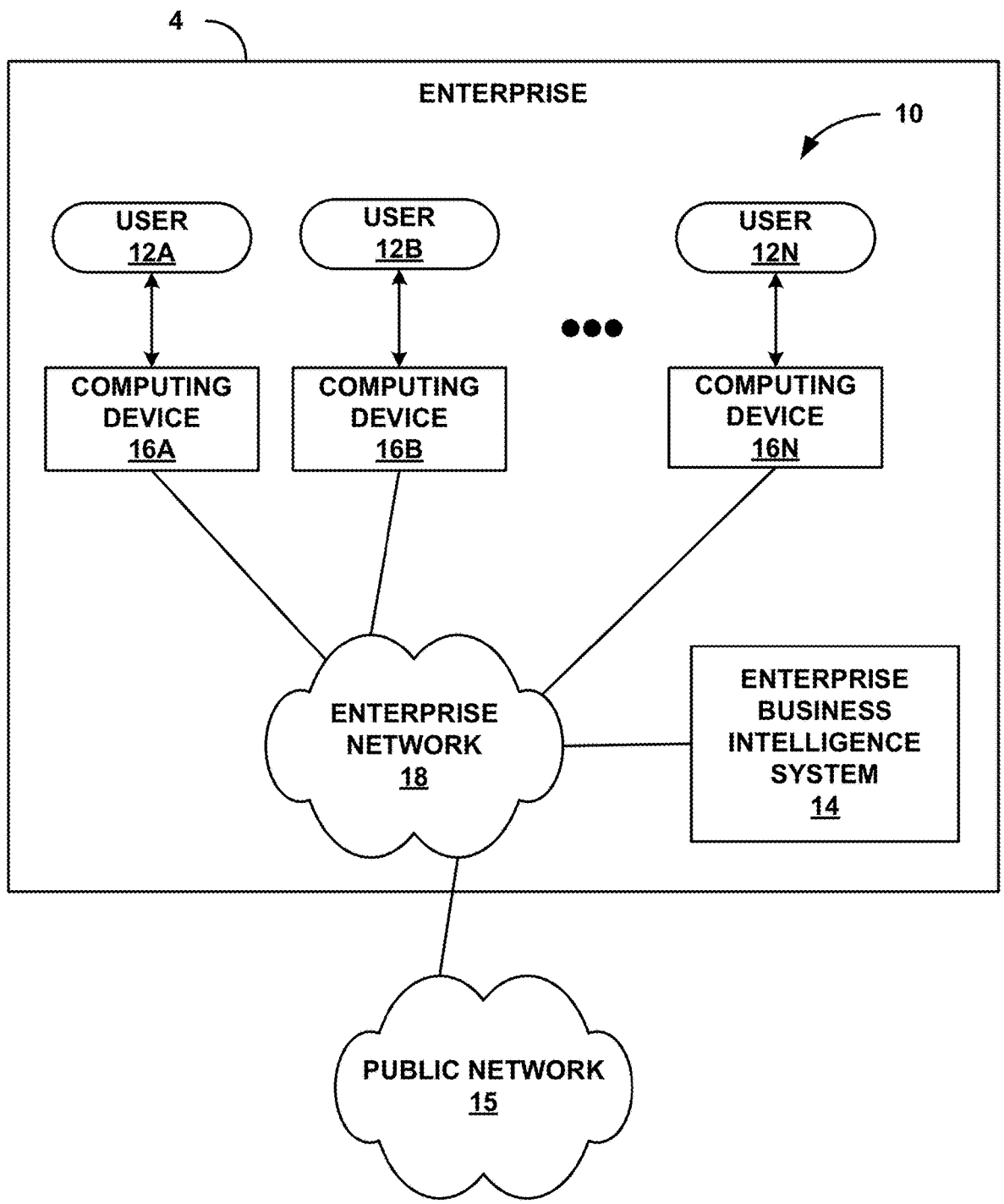
FIG. 1 is a block diagram illustrating an example enterprise having a computing environment in which users interact with an enterprise business intelligence system and data sources accessible over a public network.

FIG. 1 illustrates an example context in which a system of this disclosure may be used. FIG. 1 is a block diagram illustrating an example enterprise 4 having a computing environment 10 in which a plurality of users 12A-12N (collectively, "users 12") may interact with an enterprise business intelligence (BI) system 14. In the system shown in FIG. 1, enterprise business intelligence system 14 is communicatively coupled to a number of client computing devices 16A-16N (collectively, "client computing devices 16" or "computing devices 16") by an enterprise network 18. Users 12 interact with their respective computing devices to access enterprise business intelligence system 14. Users 12, computing devices 16A-16N, enterprise network 18, and enterprise business intelligence system 14 may all be either in a single facility or widely dispersed in two or more separate locations anywhere in the world, in different examples.

For exemplary purposes, various examples of the techniques of this disclosure may be readily applied to various software systems, including enterprise business intelligence systems or other large-scale enterprise software systems. Examples of enterprise software systems include enterprise financial or budget planning systems, order management systems, inventory management systems, sales force management systems, business intelligence tools, enterprise reporting tools, project and resource management systems, and other enterprise software systems.

In this example, enterprise BI system 14 includes servers that run BI dashboard web applications and may provide business analytics software. A user 12 may use a BI portal on a client computing device 16 to view and manipulate information such as business intelligence reports ("BI reports") and other collections and visualizations of data via their respective computing devices 16. This may include data from any of a wide variety of sources, including from multidimensional data structures and relational databases within enterprise 4, as well as data from a variety of external sources that may be accessible over public network 15.

Users 12 may use a variety of different types of computing devices 16 to interact with enterprise business intelligence system 14 and access data visualization tools and other resources via enterprise network 18. For example, an enterprise user 12 may interact with enterprise business intelligence system 14 and run a business intelligence (BI) portal (e.g., a business intelligence dashboard, etc.) using a laptop computer, a desktop computer, or the like, which may run a web browser. Alternatively, an enterprise user may use a smartphone, tablet computer, or similar device, running a business intelligence dashboard in either a web browser or a dedicated mobile application for interacting with enterprise business intelligence system 14.

Enterprise network 18 and public network 15 may represent any communication network, and may include a packet-based digital network such as a private enterprise intranet or a public network like the Internet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

Figure 2:
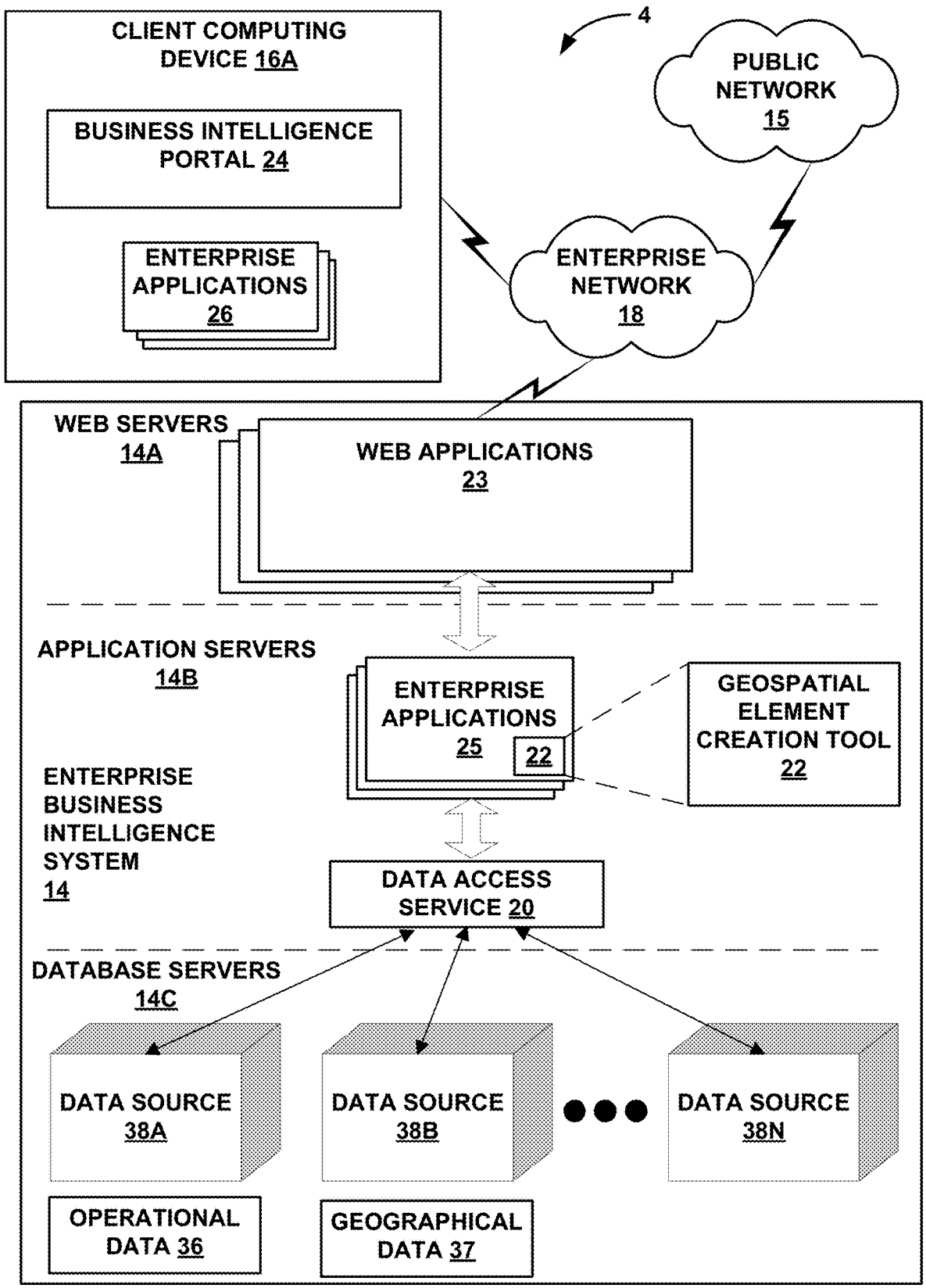
FIG. 2 is a block diagram illustrating one embodiment of an enterprise business intelligence computing environment including a geospatial element creation system as part of a BI computing system.

FIG. 2 is a block diagram illustrating in further detail portions of one embodiment of an enterprise business intelligence (BI) system 14. In this example implementation, a single client computing device 16A is shown for purposes of example and includes a BI portal 24 and one or more client-side enterprise software applications 26 that may utilize and manipulate multidimensional data, including to view data visualizations and analytical tools with BI portal 24. BI portal 24 may be rendered within a general web browser application, within a locally hosted application or mobile application, or other user interface. BI portal 24 may be generated or rendered using any combination of application software and data local to the computing device it's being generated on, and/or remotely hosted in one or more application servers or other remote resources.

BI portal 24 may output data visualizations for a user to view and manipulate in accordance with various techniques described in further detail below. BI portal 24 may present data in the form of charts or graphs that a user may manipulate, for example. BI portal 24 may present visualizations of data based on data from sources such as a BI report, e.g., that may be generated with enterprise business intelligence system 14, or another BI dashboard, as well as other types of data sourced from external resources through public network 15. BI portal 24 may present visualizations of data based on data that may be sourced from within or external to the enterprise.

FIG. 2 depicts additional detail for enterprise business intelligence system 14 and how it may be accessed via interaction with a BI portal 24 for depicting and providing visualizations of business data. BI portal 24 may provide visualizations of data that represents, provides data from, or links to any of a variety of types of resource, such as a BI report, a software application, a database, a spreadsheet, a data structure, a flat file, Extensible Markup Language ("XML") data, a comma separated values (CSV) file, a data stream, unorganized text or data, or other type of file or resource. BI portal 24 may also provide visualizations of data based on aggregated geospatial elements generated by a geospatial element creation tool 22, such as map images in a mapping application with aggregated geospatial elements superimposed or overlaid on the map images, for example.

Geospatial element creation tool 22 may be hosted among enterprise applications 25, as in the example depicted in FIG. 2, or may be hosted elsewhere, including on a client computing device 16A, or distributed among various computing resources in enterprise business intelligence system 14, in some examples. Geospatial element creation tool 22 may be implemented as or take the form of a stand-alone application, a portion or add-on of a larger application, a library of application code, a collection of multiple applications and/or portions of applications, or other forms, and may be executed by any one or more servers, client computing devices, processors or processing units, or other types of computing devices.

As depicted in FIG. 2, enterprise business intelligence system 14 is implemented in accordance with a three-tier architecture: (1) one or more web servers 14A that provide web applications 23 with user interface functions, including a server-side BI portal application 21; (2) one or more application servers 14B that provide an operating environment for enterprise software applications 25 and a data access service 20; and (3) database servers 14C that provide one or more data sources 38A, 38B, . . . , 38N ("data sources 38"). Enterprise software applications 25 may include geospatial element creation tool 22 as one of enterprise software applications 25 or as a portion or portions of one or more of enterprise software applications 25. The data sources 38 may include two-dimensional databases and/or multidimensional databases or data cubes. The data sources may be implemented using a variety of vendor platforms, and may be distributed throughout the enterprise. As one example, the data sources 38 may be multidimensional databases configured for Online Analytical Processing (OLAP). As another example, the data sources 38 may be multidimensional databases configured to receive and execute Multidimensional Expression (MDX) queries of some arbitrary level of complexity. As yet another example, the data sources 38 may be two-dimensional relational databases configured to receive and execute SQL queries, also with an arbitrary level of complexity. Data sources 38 may also include one or more sets of operational data 36 (e.g., business data or proprietary data) and one or more sets of geographical data 37 (e.g., public geographical data, custom business geographical data).

Multidimensional data structures are "multidimensional" in that each multidimensional data element is defined by a plurality of different object types, where each object is associated with a different dimension. The enterprise applications 26 on client computing device 16A may issue business queries to enterprise business intelligence system 14 to build reports. Enterprise business intelligence system 14 includes a data access service 20 that provides a logical interface to the data sources 38. Client computing device 16A may transmit query requests through enterprise network 18 to data access service 20. Data access service 20 may, for example, execute on the application servers intermediate to the enterprise software applications 25 and the underlying data sources in database servers 14C. Data access service 20 retrieves a query result set from the underlying data sources, in accordance with query specifications. Data access service 20 may intercept or receive queries, e.g., by way of an API presented to enterprise applications 26. Data access service 20 may then return this result set to enterprise applications 26 as BI reports, other BI objects, and/or other sources of data that are made accessible to BI portal 24 on client computing device 16A. These may include geospatial element information such as aggregated geospatial elements generated by geospatial element creation tool 22. Geospatial element creation tool 22 may collect data, such as geospatial data and geographical data, from operational data 36 and geographical data 37 in particular among data sources 38, and generate aggregated geospatial elements based on the geospatial data and geographical data, as further described below.

As noted above, base maps may provide graphical location, place, and satellite images that may be shown in applications and web pages. Overlay images may be placed in superposition with base maps with varying levels of opacity or transparency to show geographical areas such as individual states, provinces, counties, cities, postal codes, municipal districts, or any other geographical areas with definable boundaries that may be expressed as polygon outlines or other shape representations. For example, such geospatial shape files may be implemented as Keyhole Markup Language (KML) files in accordance with the KML standard promoted by the Open Geospatial Consortium, or other GIS shape files typically used in GIS applications. A user may typically create such a geospatial shape file with GIS authoring tools that enable the user to draw outlines over a base map. The resulting polygon or other defined shape may be used to show the shape as an overlay over a base map in an application or a web page.

Example embodiments of the present disclosure, such as geospatial element creation tool 22 depicted in FIG. 2, may enable the creation of map shape visualization data such as geospatial files directly from data, and without manually defining or drawing shapes or using typical GIS tools. As described above and further below, geospatial element creation tool 22 may be implemented in one or more computing devices, and may involve one or more applications or other software modules that may be executed on one or more processors. Example embodiments of the present disclosure may illustratively be described in terms of the example of geospatial element creation tool 22 in various examples described below. Geospatial element creation tool 22 may enable the creation of geospatial files that may take the form of reusable shape or polygon files that may be included in or superimposed on a map representation. In various examples applicable herein, the term "geospatial file" may be used to refer to any file, set of files, or other set of data that represents or encodes a polygon, a shape, or another geographical representation that may be used with or superimposed on a map, including a KML file or other type of GIS shape file.

A geospatial file may include data defining a polygon to emulate any shape to arbitrarily high precision. A geospatial file may also include data defining a shape either two-dimensionally or as a three-dimensional projection, such as including topological or altitude information and/or being defined as a section of a three-dimensional shape such as the surface of a sphere or an oblate spheroid. These or other aspects of representation may be used in various embodiments to enable a geospatial file to model a geographical area to an arbitrarily high level of precision, in either two or three dimensions.

Geospatial element creation tool 22 of this disclosure may read data tables of geospatial line items with reoccurring place names and other details from Business Intelligence reports or other operational data, which may be organized in columns, and which may reference any of several forms of data such as geographical divisions (e.g., states, counties, zip code areas, census blocks, etc.); latitude and longitude coordinates; polygons defining geospatial areas; or any set of coordinate data that defines one or more points, line segments, or areas over a base map. Geospatial element creation tool 22 may gather data in any combination of such forms, including from mixed sets of data. Geospatial element creation tool 22 may then build aggregate logical shapes using another set of existing geospatial shapes to build composite shapes that can subsequently be used to build a geospatial file, potentially such as a KML file or other type of GIS shape file.

An example of mixed geographical column data that may be accessed and used by geospatial element creation tool 22 in creating geospatial files, is shown in Table 1:

TABLE 1

| Customer # | Sales Region | State | (LAT, LONG) |
|---|---|---|---|
| 0001 | East | New York | |
| 0002 | East | New Jersey | |
| 0003 | West | Washington | |
| 0004 | West | | (45.513, −122.593) |

Geospatial element creation tool 22 may collect the data in Table 1 and combine it with existing geospatial data, such as shape files of geographical divisions such as states of the U.S.A. Geospatial element creation tool 22 may then build composite shapes that may aggregate the shape files of geographical divisions into aggregated geospatial elements that indicate geographical areas, and that may be or may include geospatial files such as KML files, other GIS files, or other geospatial files that may be compatible for usage with a Geographical Information System (GIS) application. Geospatial element creation tool 22 may subsequently assign additional geographical areas to the aggregated geospatial elements. Geospatial element creation tool 22 may receive or define a selected outer geographical boundary for a geographical domain within which the geographical locations indicated by the data elements are contained, and geospatial element creation tool 22 may assign portions of the area within the outer geographical boundary to the aggregated geospatial elements. In some examples, geospatial element creation tool 22 may assign all portions of the area within the outer geographical boundary to the aggregated geospatial elements, so that each point within the outer geographical boundary is contained within one of the aggregated geospatial elements.

The operational data may include, e.g., Business Intelligence reports or other Business Intelligence data that may indicate geographical areas associated with business data, such as states or other locations or areas associated with sales transactions or other business events, and the geographical indicators may include geographical indicators associated with the Business Intelligence data. Geospatial element creation tool 22 may, in the process of collecting the geographical indicators, searching Business Intelligence data sources in the set of operational data for the geographical indicators.

Figure 3:
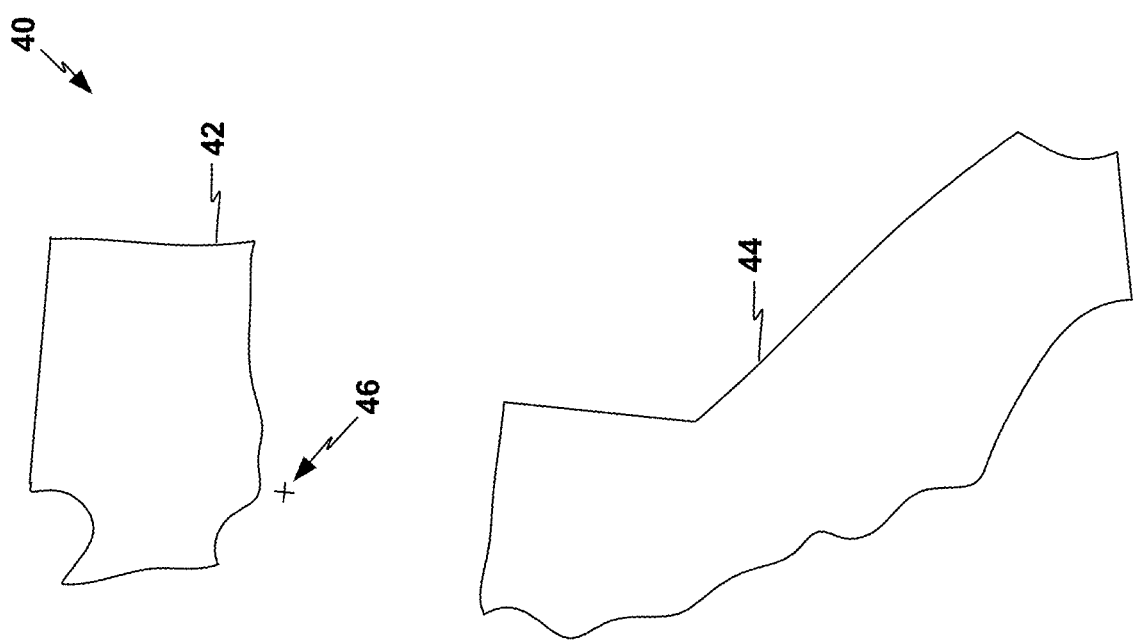
FIG. 3 shows an image of two geospatial shape files and a coordinate-defined point, in one example.

FIGS. 3-6 show examples of generating aggregated geospatial elements based on geographical indicators from a set of operational data and geospatial data from a set of geographical data, such as may be performed by geospatial element creation tool 22 executing on one or more computing devices. FIG. 3 shows an image 40 of two geospatial shape files 42, 44 and a coordinate-defined point 46, in one example. In this example, geospatial shape files 42, 44 represent the states of California and Washington, and coordinate-defined point 46 is defined by a geographical indicator (in particular, a latitude-longitude coordinate set) from a set of operational data.

Figure 4:
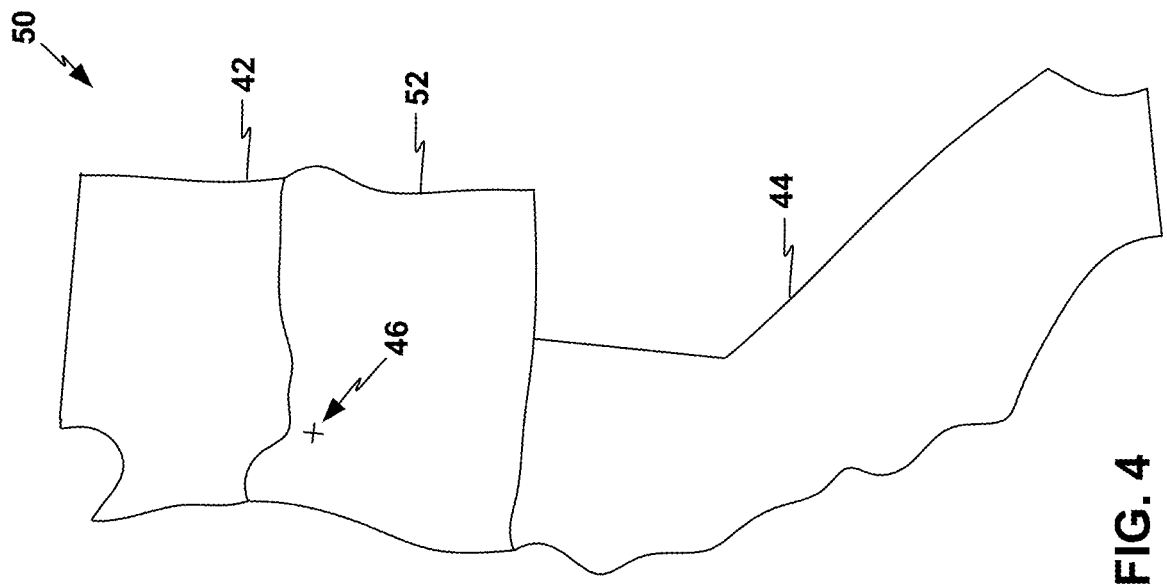
FIG. 4 shows an image of geospatial shape files and coordinate-defined point along with a newly generated geospatial shape file, in one example.

FIG. 4 shows an image 50 of geospatial shape files 42, 44 and coordinate-defined point 46 along with a newly generated geospatial shape file 52, in one example. Geospatial element creation tool 22 may collect and assign new geospatial shape file 52 for the state of Oregon to correspond to the coordinate-defined point 46 because geospatial element creation tool 22 finds that the latitude and longitude coordinates of coordinate-defined point 46 (e.g., 45.513 latitude, −122.593 longitude, as shown in Table 1) lie within the state of Oregon. Geospatial element creation tool 22 may discover that the latitude and longitude coordinates of coordinate-defined point 46 lie within the state of Oregon by comparing the latitude and longitude of coordinate-defined point 46 with geospatial data from a set of geographical data.

For example, one set of geographical data may include data defining the geographical extent of each of the states and other territories of the U.S.A. in terms of the latitude and longitude of each line segment of the border of each state in a polygon representation, for example. Geospatial element creation tool 22 may have regular or ongoing access to this set of geographical data, and potentially to one or more additional sets of geographical data of any type and from any source. Geospatial element creation tool 22 may associate any type of geographical indicator from a set of operational data (such as BI data on business transactions) with geospatial data from a set of geographical data, where the geospatial data is associated with the one or more geographical areas indicated by the one or more geographical indicators.

In other examples, geospatial element creation tool 22 may collect geographical indicators of any type from operational data, and indicating geographical areas of any type. For example, the geographical indicators may include any data that indicates or may potentially indicate a geographical position. Examples of geographical indicators include coordinate sets, place names, names of geographical divisions, phone numbers with area codes, Internet Protocol (IP) addresses, Uniform Resource Locators (URLs) having a geographical association (e.g., of a headquarters, campus, or address of a registered user or assignee of a network resource), email addresses having a geographical association (e.g., of similar types as those listed above with reference to URLs), and so forth. The geographical indicators from the operational data may indicate geographical areas of any type, including both geographical points and extended areas, and either publicly available or custom-defined geographical areas. For example, the geographical areas may include latitude and longitude coordinate sets, street addresses, plots defined in property registries, Global Positioning System (GPS) or Wi-Fi data indicating a geographical location, or any other indication of a geographical position or area. If a user selects to opt in to usage of location data, such location data may also be conveyed by or matched to a digital transmission or a digital device event, such as a phone call, a microblog post or social network post, a transmission of a text message, or an input to a data store such as a sales order or invoicing database, for example. Any of these examples of data may be stored or included in a BI report or other set of operational data, and may be collected by geospatial element creation tool 22 and used in generating aggregated geospatial elements.

Figure 5:
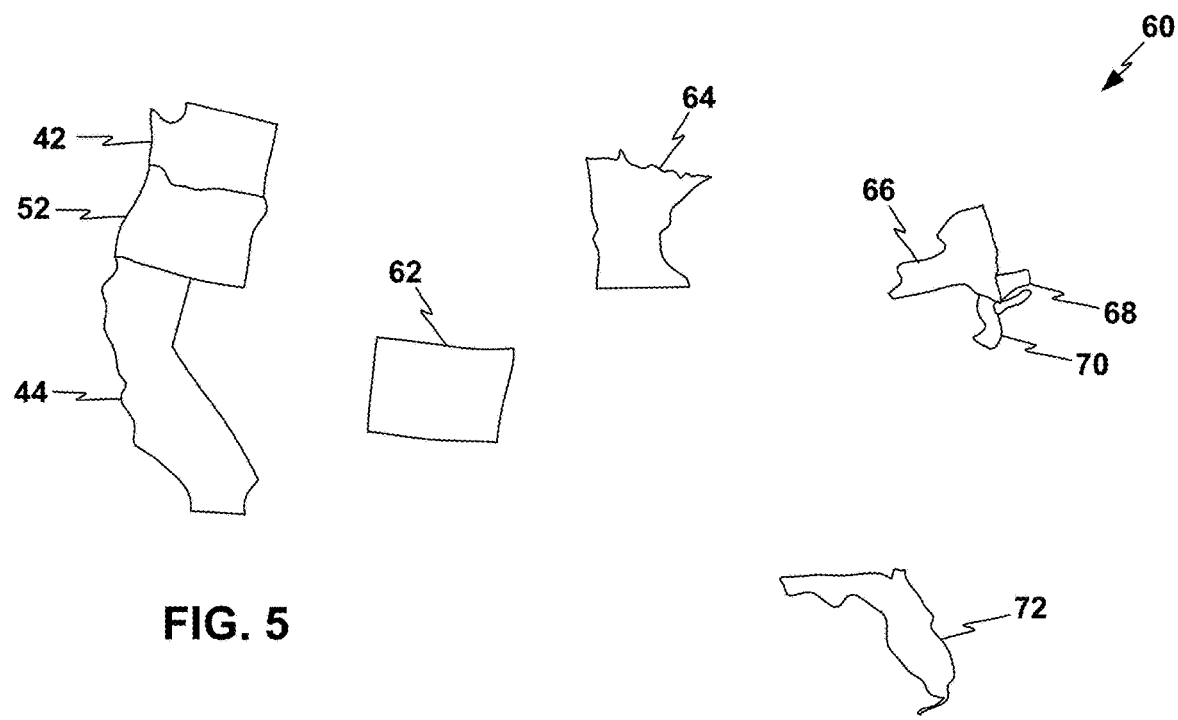
FIG. 5 shows an image of geospatial shape files in a larger context among additional geospatial shape files that a geospatial element creation tool may use in generating aggregated geospatial elements based on geographical indicators from operational data and geospatial data from one or more geographical data sources, in one example.

FIG. 5 shows an image 60 of geospatial shape files 42, 44, 52 in a larger context among additional geospatial shape files, that geospatial element creation tool 22 may use in generating aggregated geospatial elements based on geographical indicators from operational data and geospatial data from one or more geographical data sources, in one example. In particular, geospatial shape files 62, 64, 66, 68, 70, and 72 may represent additional states. In this example, a business enterprise may have operational data that indicates business transactions that have taken place in a handful of states, as shown in FIG. 5. In this example, a business user may have a goal of visualizing and analyzing the geographical layout of the business transactions and visualizing or defining relevant custom geographical divisions, such as sales regions, for future operations of the business enterprise. Geospatial element creation tool 22 may collect geographical indicators from operational data of the enterprise, such as BI reports with information on past sales or other business transactions, that indicate the states represented by the geospatial shape files depicted in FIG. 5. Geospatial element creation tool 22 may also collect geospatial data defining the shapes of the states represented by the geospatial shape files depicted in FIG. 5 from a set of geographical data.

Geospatial element creation tool 22 may then generate aggregated geospatial elements based on the geographical indicators and the geospatial data. In particular, geospatial element creation tool 22 may assign or allocate portions of the outer boundary of the contiguous lower 48 states of the U.S.A. together with states that have past business transaction records, to create continuous sales regions that include the existing states and together fill in the entire territory of the contiguous lower 48 states, in this example. Sales regions are one example of aggregated geospatial elements that geospatial element creation tool 22 may create that combine geographical regions based on geospatial data from an operational data set (e.g., business records of past business transactions in certain states) and additional geographical data from a geographical data set (e.g., data defining the areas of all the states in the contiguous lower 48 states). The business user may assign certain states having past business transactions to different sales regions. Generating aggregated geospatial elements based on the geographical indicators and the geospatial data may also include geospatial element creation tool 22 automatically assigning the remaining states of the 48 contiguous states that don't have records of past business transactions to one of the existing sales regions defined by the business user. Geospatial element creation tool 22 may use any of various methods (e.g., applying a set of logic rules, prioritizing proximity of areas, applying gap and boundary simplifications, applying aggregation rules entered by a business user) in automatically assigning unassigned geographical areas, such as states, to existing geographical areas based on the enterprise's operational data.

Figure 6:
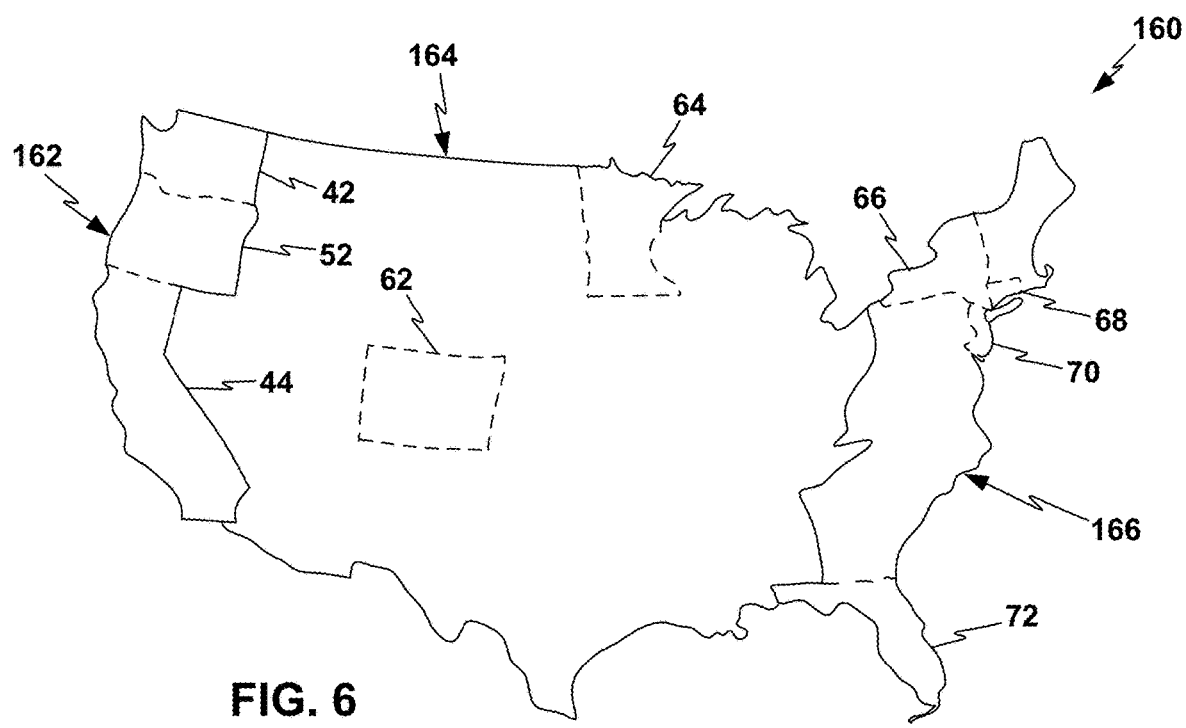
FIG. 6 shows an image of geospatial shape files as part of aggregated geospatial elements that have been automatically generated by a geospatial element creation tool, in one example.

FIG. 6 shows an image 160 of geospatial shape files 42, 44, 52, 62, 64, 66, 68, 70, and 72 as part of aggregated geospatial elements 162, 164, 166 (for different sales regions) that have been automatically generated by geospatial element creation tool 22, in one example. In particular, aggregated geospatial elements 162, 164, 166 represent a Western sales region, a Central sales region, and an Eastern sales region, respectively (and with state borders internal to a particular sales region depicted in dashed lines rather than solid lines in FIG. 6). Geospatial element creation tool 22 may combine states that have sales transaction records and potentially have existing sales region assignments into aggregated geospatial elements representing sales regions. The aggregated geospatial elements 162, 164, 166 may also be defined with internal state geospatial areas for all their individual states (not depicted in FIG. 6), and with additional geospatial data such as transaction data for individual business transactions or other locations or events relevant to an enterprise, or hierarchical geospatial data apportioning geospatial data between multiple levels of geographical areas (e.g., counties or zip code areas defined within the level of individual states, and business transactions assigned to the individual counties or zip code areas).

In particular, in this example, geospatial element creation tool 22 may combine geospatial shape files 42, 44, and 52 into aggregated geospatial element 162 for a Western sales region, combine geospatial shape files 62 and 64 into aggregated geospatial element 164 for a Central sales region, and combine geospatial shape files 66, 68, 70, and 72 into aggregated geospatial element 166 for an Eastern sales region. In particular in this example, geospatial element creation tool 22 may generate the Western sales region aggregated geospatial element 162 with a polygon or other shape defined by a combination of existing geospatial shape files 42, 44, 52 for Washington, California, and Oregon, respectively (with the Oregon geospatial shape file 52 already collected from a geographical data source or set of geographical data based on the coordinate point 46 as described above); the Central sales region aggregated geospatial element 164 with a polygon or other shape defined by a combination of existing geospatial shape files 62 and 64 for Colorado and Minnesota, respectively; and Eastern sales region aggregated geospatial element 166 with a polygon or other shape defined by a combination of existing geospatial shape files 66, 68, 70, and 72 for New York, Connecticut, New Jersey, and Florida, respectively. Geospatial element creation tool 22 may then apply any of various techniques or methods in assigning other geographical areas (e.g., other states) to one or another of the aggregated geospatial elements along with the states represented by geospatial shape files 42, 44, 52, 62, 64, 66, 68, 70, 72, 74, that have records of business transactions. Example details of this process are described further below.

Geospatial element creation tool 22 may also enable a business user to manually edit the aggregated geospatial elements after geospatial element creation tool 22 has automatically generated the aggregated geospatial elements. However, geospatial element creation tool 22 may generate the aggregated geospatial elements in accordance with rules and techniques that are based on geographical logic and business logic such that the automatically generated aggregated geospatial elements are thoroughly suitable for usage by a business user and by a business. Geospatial element creation tool 22 may additionally enable a business user to edit the rules, priorities, or techniques that geospatial element creation tool 22 uses in generating the aggregated geospatial elements, such that a business user may refine the capability of geospatial element creation tool 22 to automatically generate aggregated geospatial elements that are valuable for usage by a business user or by a business with minimal or no manual editing.

Therefore, in this example, the outer boundary of the lower 48 contiguous states of the U.S.A. may define an outer geographical boundary that contains the one or more geographical areas (particular states and/or latitude/longitude coordinates, in this example) indicated by the one or more geographical indicators (particular states and/or latitude/longitude coordinates indicated in sales transaction business data, in this example). In this example, geospatial element creation tool 22 may assign one or more additional geographical areas contained within the outer geographical boundary, e.g., additional states within the lower 48 contiguous states, to one of the aggregated geospatial elements, e.g., sales regions for the business, in this example. In this example, the outer geographical boundary of the lower 48 states defines a total internal area, and geospatial element creation tool 22 may assign additional geographical areas contained within the outer geographical boundary (e.g., states, in this example, or other geographical areas such as counties, zip code areas, etc.) to one or more of the aggregated geospatial elements (e.g., sales regions) until every point of the total internal area is assigned to one of the aggregated geospatial elements.

In this example, geospatial element creation tool 22 may, in the process of assigning the additional geographical areas contained within the outer geographical boundary to the aggregated geospatial elements, select one of the geographical areas to assign one of the additional geographical areas to based on a set of logical rules (e.g., logic rules accounting for geometry, geographical logic, and/or business logic, as further described above and below). In this example, geospatial element creation tool 22 may also, in the process of assigning the additional geographical areas contained within the outer geographical boundary to the aggregated geospatial elements, composite one or more of the additional geographical areas together with the geographical areas indicated by the geographical indicators (e.g., the states having sales transaction data) using set union and intersection semantics.

Following are some examples of logic rules geospatial element creation tool 22 may apply in generating aggregated geospatial elements 162, 164, 166 to include the state geospatial files collected from operational and/or geographical data sources. Geospatial element creation tool 22 may collect geographical areas of the same level or order of geographical division (e.g., states) as those already defined by geospatial data in an operational data source. While these include states in the example of FIGS. 3-6, the geographical areas collected and aggregated by geospatial element creation tool 22 may include any other geographical divisions in other examples, such as countries, provinces, counties, zip code areas, census tracts, census blocks, or other publicly defined geographical divisions, as well as sales or market branches or regions or other custom and/or proprietary geographical areas defined by a business or other enterprise. Geospatial element creation tool 22 may also combine geographical areas of any of the geographical divisions described above in one or more hierarchies. Geospatial element creation tool 22 may additionally apply gaps simplifications and/or boundary simplifications in generating a composite shape, such as to fill gaps such as missing states with no data (such as transaction data from an operational data set), or to align adjacent boundaries with other composite shapes (e.g., to remove or harmonize duplicated data defining borders of adjacent states or mutually shared borders among states, countries, sales regions, or other defined geographical areas).

Geospatial element creation tool 22 may also detect that an unassigned region is to some degree surrounded by geographical regions assigned to a particular hierarchical group (e.g., sales region) and assign that unassigned region to that particular hierarchical group. Geospatial element creation tool 22 may also detect that an unassigned region has greater summed proximity to a set of regions assigned to a first hierarchical group than to other regions assigned to a second or other hierarchical groups, and assign the unassigned region to that first hierarchical group, for example. In another example, geospatial element creation tool 22 may assign areas intermediate to assigned areas to aggregated geospatial elements (e.g., sales regions) with a priority on optimizing certain variables among the aggregated geospatial elements, such as by balancing a number of transactions such as recorded sales or anticipated sales among sales region aggregated geospatial elements, for example.

For example, in generating the aggregated geospatial elements 162, 164, 166 of FIG. 6, geospatial element creation tool 22 may collect geospatial data indicating sales transactions that have taken place in California, Washington, Colorado, Minnesota, New York, Connecticut, New Jersey, and Florida, and indicating that California and Washington are assigned to a Western sales region aggregated geospatial element 162, that Colorado and Minnesota are assigned to a Central sales region aggregated geospatial element 164, and that New York, Connecticut, New Jersey, and Florida are assigned to an Eastern sales region aggregated geospatial element 166. Geospatial element creation tool 22 may also receive data on the sales transaction associated with the coordinate-defined point 46 as described above, with which geospatial element creation tool 22 may already have associated with a geographical area for Oregon, as described above. Geospatial element creation tool 22 may associate each of the remaining states of the lower 48 states with the states with sales transactions in sales region aggregated geospatial elements in a way that ensures that the additional states are grouped into aggregated geospatial elements in a way that complies with rules of geographical logic and/or business logic. As one example, geospatial element creation tool 22 may assign Oregon to the Western sales region aggregated geospatial element 162, based at least in part on geographical data indicating that Oregon is positioned between and shares borders with two states already assigned to the Western sales region aggregated geospatial element 162, and further, that adding Oregon to the Western sales region aggregated geospatial element 162 enables joining the Western sales region aggregated geospatial element 162 into a single, contiguous area. These examples are factors that may be assigned priorities in the geographical logic and/or business logic that geospatial element creation tool 22 applies in assigning additional geographical areas to existing geographical areas indicated by operational data to generate aggregated geospatial elements.

Additionally, geospatial element creation tool 22 may apply analogous rules to assign geographical areas between New York and Florida, and geographical areas separated by New York from the rest of the 48 states, to the Eastern sales region aggregated geospatial element 166, and to assign geographical areas between and proximate to Colorado and Minnesota to the Central sales region aggregated geospatial element 164. For additional geographical areas in between those already assigned to one of the three geographical areas, geospatial element creation tool 22 may apply additional rules of geographical logic and/or business logic, such as balancing sales volume among different sales regions based on volume of past sales transactions collected from an operational data set, for example.

Additional details of an example set of rules or steps that may be applied by geospatial element creation tool 22 in one illustrative example is described as follows, labeled in order in terms of illustrative phases 1 through 15 (with the understanding that each of phases 1-15 may represent a rule, a step, an algorithm portion, or another implementation, and may overlap or be re-ordered in time or function with any of the other phases, and any of which may be performed by other modules or resources besides geospatial element creation tool 22 in various examples):

1. Geospatial element creation tool 22 may collect and assemble a corpus of existing geospatial data (e.g., geospatial files with polygon shape definitions of geographical areas) from any of various public and private sources, potentially including one or more sets of operational data (e.g., custom or proprietary business or other enterprise data) and/or one or more sets of geographical data. This may include collecting shape outlines, such as country, state, province, county, postal code, census block, polling district, or any named custom shape in a set of lookup tables. This may include more than one hierarchy of geographical shapes, such as two geographical hierarchies labeled H1 and H2, for example: H1) Country→State→Census Tract→Census block, and H2) Country→State→zipCode.

2. Geospatial element creation tool 22 may collect, from an operational data set, a corpus of report model metadata used for the purpose of business report authoring. Geospatial element creation tool 22 may use these model hierarchies as an ontology for assembling composite shapes based on smaller shapes from phase 1, described above, starting in phase 7, described below.

3. Geospatial element creation tool 22 may collect, from an operational data set, a corpus of reports and data base tables that use the models from phase 2 described above.

4. Geospatial element creation tool 22 may identify references to the polygon shapes defined in phase 1 in existing dataset values from phase 3. Geospatial element creation tool 22 may define usable shapes for the named entities in phase 2. For example: Country→Sales Region→State-→Sales Branch Area where no shapes exist for Sales Region or Sales Branch.

5. When geospatial element creation tool 22 may search for a direct match in a lookup table from phase 1 with a data value from phases 3 and 4, geospatial element creation tool 22 may associate the metadata from phase 2 and value from phase 3 to the geospatial shape from phase 1.

6. Geospatial element creation tool 22 may search for indirect associations to phase 1 by searching entity-relations or dimensional associations from phase 2 to find matching 'aliases' based on values from phase 3. For example, geospatial element creation tool 22 may search 1:1 and n:1 relations between customer number→customer name-→sales branch name→sales branch location. Geospatial element creation tool 22 may collect unique associations between this related metadata and named shapes in phase 1. For each of the associations geospatial element creation tool 22 finds in phases 5 and 6, geospatial element creation tool 22 may use the model hierarchy from phase 2 to find additional names for which geospatial element creation tool 22 can associate values with names shapes from phase 1. For example, geospatial element creation tool 22 may potentially identify parent metadata such as counties, states, and sales regions by sample values for these entities.

7. Similar to phase 6, geospatial element creation tool 22 may search for indirect associations to phase 1 by searching entity-relations or dimensional associations from phase 2 to find matching values from parents in phase 7.

8. When this phase of processing is complete, leaf node names may have associations to shapes from phase 1. Parent items as defined in phase 2 may be either similarly associated to shapes in phase 1 or these parents may be unassociated.

9. Geospatial element creation tool 22 may build composite shapes for unassociated parents from phase 8 in phases 11 and 12.

10. Starting at the bottom of each hierarchy from phase 9, geospatial element creation tool 22 may search for the first unassigned parent. Geospatial element creation tool 22 may dynamically define a new shape by compositing one or more or all associated child shapes from phase 1. Geospatial element creation tool 22 may add the resulting shape to phase 1 using set union or set intersection semantics, for example.

11. Geospatial element creation tool 22 may repeat phase 10 until it has assigned newly defined composite shapes for all parents.

12. Geospatial element creation tool 22 may use the resulting geospatial hierarchy created in phase 11 and 12 to aggregate and make geospatial queries using shapes from phase 1.

13. Geospatial element creation tool 22 may use the resulting geospatial hierarchy created in phases 11 and 12 to validate and further cleanse data used in phase 3.

14. Geospatial element creation tool 22 may use the resulting geospatial hierarchy created in phases 11 and 12 to show data from phase 3 in maps and other geospatial visualizations (e.g., the images 50, 60, 160 of FIGS. 4-6).

15. Geospatial element creation tool 22 may use the resulting geospatial hierarchy created in phases 11 and 12 to associate new collected data with a geospatial attribute to any of the items in phases 11 and 12 based on geospatial queries such as ST_Countains(NewPoint within shape).

Geospatial element creation tool 22 or other modules or techniques of this disclosure may therefore provide a geospatial rendering and analysis system that builds useful shapes, areas and polygons without the need for visual authoring tools and associated skills, and/or one of more sets of geospatial shape hierarchies used as reference for granular polygon definition. Geospatial element creation tool 22 or other modules or techniques of this disclosure may also augment a business model hierarchy in which one or more levels previously had no geospatial associations using geospatial data (e.g., geographical shapes). Geospatial element creation tool 22 or other modules or techniques of this disclosure may also scan and collect from a business model hierarchy and related reports for direct and indirect references (e.g., geographical references) based on the business model's E-R and containment associations. Geospatial element creation tool 22 or other modules or techniques of this disclosure may also use, e.g., references from sets of geospatial shape hierarchies, business model hierarchies augmented with geospatial associations, or direct and indirect references based on a business model's E-R and containment associations, to build a list of shapes that are composited or aggregated together using set union and intersection semantics to create shape definitions for different levels in a business model hierarchy.

Geospatial element creation tool 22 or other system of this disclosure may therefore enable building a set of industry standard geospatial shapes and area objects suitable for geospatial visualization and query using a business model hierarchy and related business reports that define dimensional relationships such that shapes associated with leaf nodes of the model hierarchy are combined to build a composite shape hierarchy using names and attributes from the business model and reports without requiring visual authoring tools or other explicit drawing or assembly tasks. Geospatial element creation tool 22 or other system of this disclosure may further use geospatial files (e.g., with shapes) used to produce visualizations and queries based on names and attributes from the business model hierarchy and related business reports that use geospatial queries for the associated shapes producing result sets that represent either dimensional and geospatial cross-products with requiring an author to explicitly create geospatial queries.

The operational data may thus include a business model hierarchy that may include leaf nodes that include geographical indicators, and one or more of the aggregated geospatial elements may be associated with one or more of the leaf nodes of the business model hierarchy. The leaf nodes may include one or more names and one or more attributes, wherein the one or more names comprise one or more names of geographical areas, and the one or more attributes comprise one or more attributes of geographical areas. The operational data may also include a business model hierarchy and one or more business transaction records, and the business model hierarchy may include leaf nodes corresponding to geographical divisions of the business model hierarchy, where the leaf nodes may include geographical indicators. One or more of the aggregated geospatial elements may be associated with one or more of the geographical divisions of the business model hierarchy and with one or more of the business transaction records. The aggregated geospatial elements may be in a format that is searchable with a geospatial query using set union and intersection semantics.

Figure 7:
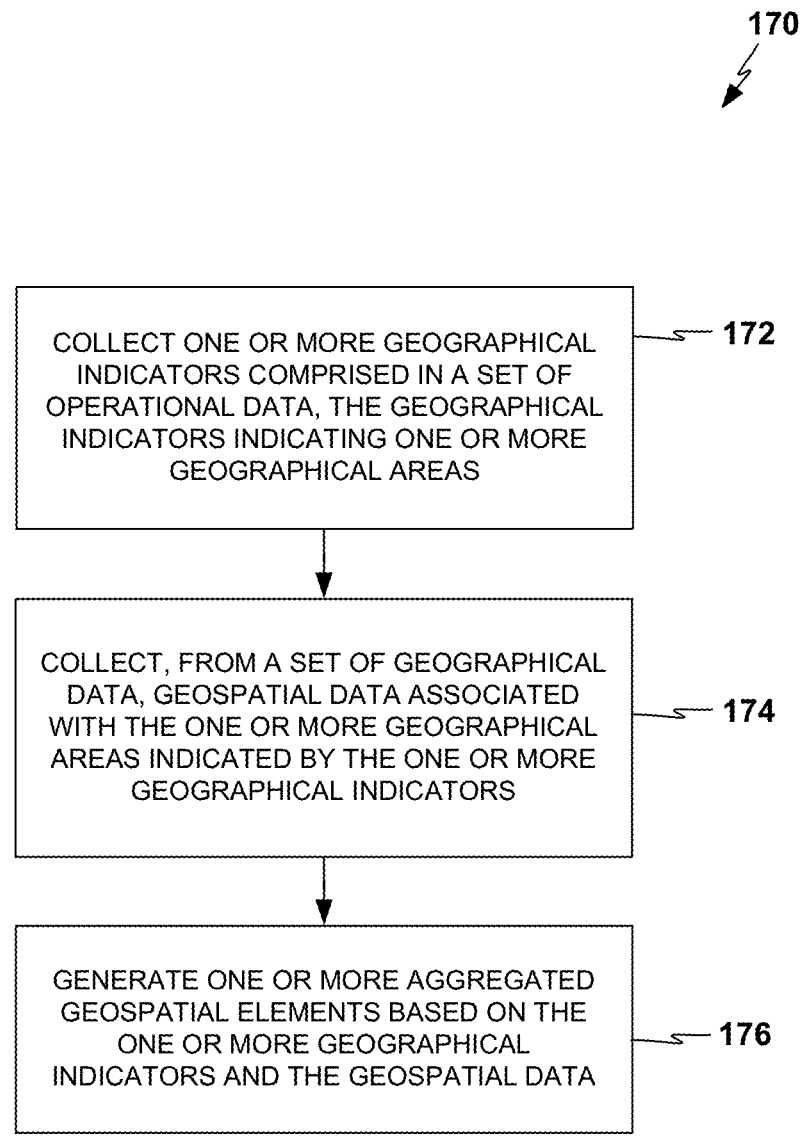
FIG. 7 depicts a process for creating geospatial elements based on geographical data in a business intelligence (BI) system.

FIG. 7 shows a flowchart for an example overall process 170 that geospatial element creation tool 22, executing on one or more computing devices (e.g., servers, computers, processors, etc.), may perform. Geospatial element creation tool 22 may collect one or more geographical indicators (e.g., shape files, data defining a geographical area) comprised in a set of operational data (e.g., entries, files, or other data elements in a database or data cube for Business Intelligence data of a business or other enterprise), the geographical indicators indicating one or more geographical areas (172). Geospatial element creation tool 22 may collect, from a set of geographical data (e.g., any public, custom, or proprietary data store or data set indicating geographical information or data), geospatial data associated with the one or more geographical areas indicated by the one or more geographical indicators (174). Geospatial element creation tool 22 may generate one or more aggregated geospatial elements (e.g., sales regions or other divisions that are potentially relevant to a business, government body, research organization, or other enterprise) based on the one or more geographical indicators and the geospatial data (176).

Figure 8:
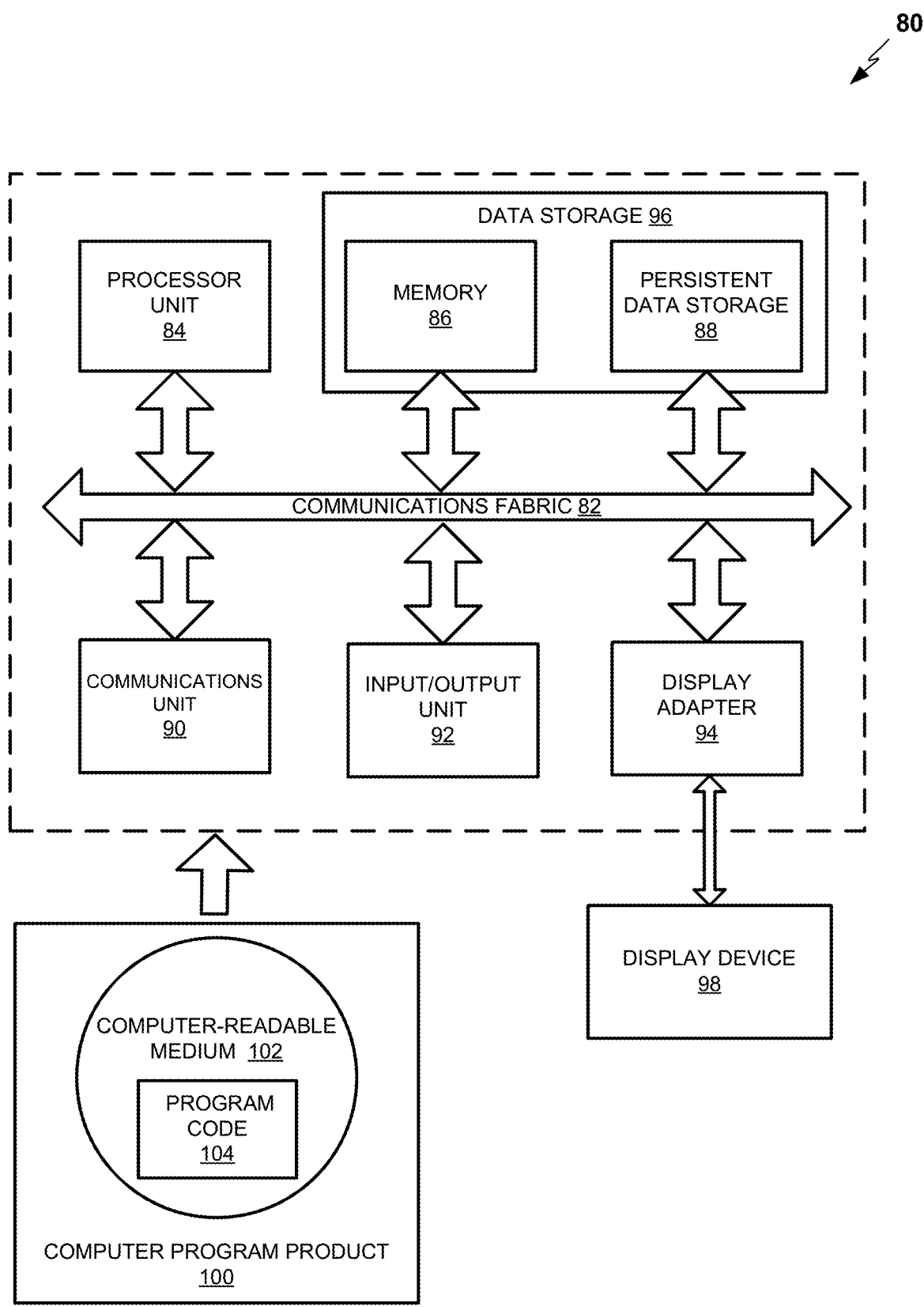
FIG. 8 is a block diagram of a computing device that may execute a geospatial element creation system as part of a BI computing system.

FIG. 8 is a block diagram of a computing device 80 that may be used to execute a geospatial element creation tool 22, according to an illustrative example. Computing device 80 may be a server such as one of web servers 14A or application servers 14B as depicted in FIG. 2. Computing device 80 may also be any server for providing an enterprise business intelligence application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 80 may include a computer having capabilities or formats other than or beyond those described herein.

In the illustrative example of FIG. 8, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a geospatial element creation tool 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

As will be appreciated by a person skilled in the art, aspects of the present disclosure may be embodied as a method, a device, a system, or a computer program product, for example. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer-readable data storage devices or computer-readable data storage components that include computer-readable medium(s) having computer readable program code embodied thereon. For example, a computer-readable data storage device may be embodied as a tangible device that may include a tangible data storage medium (which may be non-transitory in some examples), as well as a controller configured for receiving instructions from a resource such as a central processing unit (CPU) to retrieve information stored at one or more particular addresses in the tangible, non-transitory data storage medium, and for retrieving and providing the information stored at those particular one or more addresses in the data storage medium.

The data storage device may store information that encodes both instructions and data, for example, and may retrieve and communicate information encoding instructions and/or data to other resources such as a CPU, for example. The data storage device may take the form of a main memory component such as a hard disc drive or a flash drive in various embodiments, for example. The data storage device may also take the form of another memory component such as a RAM integrated circuit or a buffer or a local cache in any of a variety of forms, in various embodiments. This may include a cache integrated with a controller, a cache integrated with a graphics processing unit (GPU), a cache integrated with a system bus, a cache integrated with a multi-chip die, a cache integrated within a CPU, or the processor registers within a CPU, as various illustrative examples. The data storage apparatus or data storage system may also take a distributed form such as a redundant array of independent discs (RAID) system or a cloud-based data storage service, and still be considered to be a data storage component or data storage system as a part of or a component of an embodiment of a system of the present disclosure, in various embodiments.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, electro-optic, heat-assisted magnetic, or semiconductor system, apparatus, or device, or any suitable combination of the foregoing. A non-exhaustive list of additional specific examples of a computer readable storage medium includes the following: an electrical connection having one or more wires, a portable computer diskette, a hard disc, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device, for example.

Program code embodied on a computer readable medium may be transmitted using any appropriate medium, including but not limited to radio frequency (RF) or other wireless, wire line, optical fiber cable, etc., or any suitable combination of the foregoing. Computer program code for carrying out operations for aspects of the present invention may be written in any combination of one or more programming languages, including an object oriented programming language such as Java, Smalltalk, C++, or the like, or other imperative programming languages such as C, or functional languages such as Common Lisp, Haskell, or Clojure, or multi-paradigm languages such as C #, Python, or Ruby, among a variety of illustrative examples. One or more sets of applicable program code may execute partly or entirely on the user's desktop or laptop computer, smartphone, tablet, or other computing device; as a stand-alone software package, partly on the user's computing device and partly on a remote computing device; or entirely on one or more remote servers or other computing devices, among various examples. In the latter scenario, the remote computing device may be connected to the user's computing device through any type of network, including a local area network (LAN) or a wide area network (WAN), or the connection may be made to an external computer (for example, through a public network such as the Internet using an Internet Service Provider), and for which a virtual private network (VPN) may also optionally be used.

In various illustrative embodiments, various computer programs, software applications, modules, or other software elements may be executed in connection with one or more user interfaces being executed on a client computing device, that may also interact with one or more web server applications that may be running on one or more servers or other separate computing devices and may be executing or accessing other computer programs, software applications, modules, databases, data stores, or other software elements or data structures. A graphical user interface may be executed on a client computing device and may access applications from the one or more web server applications, for example. Various content within a browser or dedicated application graphical user interface may be rendered or executed in or in association with the web browser using any combination of any release version of HTML, CSS, JavaScript, XML, AJAX, JSON, and various other languages or technologies. Other content may be provided by computer programs, software applications, modules, or other elements executed on the one or more web servers and written in any programming language and/or using or accessing any computer programs, software elements, data structures, or technologies, in various illustrative embodiments.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Aspects of the present invention are described herein with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, may create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices, to produce a computer-implemented process such that the instructions that execute on the computer or other programmable apparatus provide or embody processes for implementing the functions or acts specified in the flowchart and/or block diagram block or blocks.

The flowchart and block diagrams in the figures illustrate the architecture, functionality, and operation of possible implementations of devices, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may be executed in a different order, or the functions in different blocks may be processed in different but parallel processing threads, depending upon the functionality involved. Each block of the block diagrams and/or flowchart illustration, and combinations of blocks in the block diagrams and/or flowchart illustration, may be implemented by special purpose hardware-based systems that perform the specified functions or acts, or combinations of executable instructions, special purpose hardware, and general-purpose processing hardware.

The description of the present disclosure has been presented for purposes of illustration and description, and is not intended to be exhaustive or limited to the disclosure in the form disclosed. Many modifications and variations will be understood by persons of ordinary skill in the art based on the concepts disclosed herein. The particular examples described were chosen and disclosed in order to explain the principles of the disclosure and example practical applications, and to enable others of ordinary skill in the art to understand the disclosure for various embodiments with various modifications as are suited to the particular use contemplated. The various examples described herein and other embodiments are within the scope of the following claims.

What is claimed is:

1. A computer system comprising:
one or more processors, one or more computer-readable memories, and one or more computer-readable, tangible storage devices;
program instructions, stored on at least one of the one or more storage devices for execution by at least one of the one or more processors via at least one of the one or more memories, to collect a set of operational data including one or more geographical indicators, the one or more geographical indicators indicating one or more geographical points and extended areas;
program instructions, stored on at least one of the one or more storage devices for execution by at least one of the one or more processors via at least one of the one or more memories, to collect, from a set of geographical data, geospatial data associated with the one or more geographical points and extended areas indicated by the one or more geographical indicators, wherein the geospatial data indicates one or more visually graphical geospatial shapes that include the one or more geographical points and extended areas indicated by the one or more geographical indicators;
program instructions, stored on at least one of the one or more storage devices for execution by at least one of the one or more processors via at least one of the one or more memories, to determine a relationship between the one or more geographical indicators and the one or more geographical points and extended areas;
program instructions, stored on at least one of the one or more storage devices for execution by at least one of the one or more processors via at least one of the one or more memories, to generate, based on the one or more geographical indicators and the geospatial data, and further based on the relationship between the one or more geographical indicators and the one or more geographical points and extended areas, a plurality of aggregated geospatial elements each of the plurality of aggregated geospatial elements depict geographical areas comprising visually graphical shape outlines with aggregated boundaries defined by a subset of boundaries of the visually graphical geospatial shapes; and
program instructions, stored on at least one of the one or more storage devices for execution by at least one of the one or more processors via at least one of the one or more memories, to superpose one or more of the plurality of aggregated geospatial elements on a map image that is provided by a map application, wherein generating the one or more aggregated geospatial elements comprises assigning an additional unassigned geographical area to a selected aggregated geospatial element of the plurality of aggregated geospatial elements at least by executing a set of logical rules configured to select one of the aggregate geospatial elements to which to assign the additional unassigned geographical area based on a relative location of the additional unassigned geographical area to each of the aggregated geospatial elements in the plurality of aggregated geospatial elements, wherein the set of logical rules comprise one or more logical rules executed by at least one of the one or more processors, via at least one of the one or more memories, to fill gaps with no data within the defined boundaries of the composite shapes.

2. The computer system of claim 1, wherein a defined outer geographical boundary contains the one or more geographical points and extended areas indicated by the one or more geographical indicators, wherein the set of logical rules comprise one or more logical rules executed by at least one of the one or more processors, via at least one of the one or more memories, to assign one or more additional geographical areas contained within the outer geographical boundary to one of the aggregated geospatial elements.

3. The computer system of claim 2, wherein the set of logical rules comprise one or more logical rules executed by at least one of the one or more processors, via at least one of the one or more memories, to assign the one or more additional geographical areas contained within the outer geographical boundary to one or more of the aggregated geospatial elements until all portions of area within the outer geographical boundary are assigned to one of the aggregated geospatial elements.

4. The computer system of claim 2, wherein the set of logical rules comprise one or more logical rules executed by at least one of the one or more processors, via at least one of the one or more memories, for compositing one or more of the additional geographical areas together with the one or more geographical points and extended areas indicated by the one or more geographical indicators using set union and intersection semantics.

5. The computer system of claim 1, wherein the operational data comprises a business model hierarchy, and wherein the business model hierarchy comprises leaf nodes comprising one or more of the geographical indicators, and one or more of the aggregated geospatial elements are associated with one or more of the leaf nodes of the business model hierarchy.

6. The computer system of claim 5, wherein the leaf nodes comprise one or more names and one or more attributes, wherein the one or more names comprise one or more names of geographical areas, and the one or more attributes comprise one or more attributes of geographical areas.

7. The computer system of claim 1, wherein the operational data comprises a business model hierarchy and one or more business transaction records, wherein the business model hierarchy comprises leaf nodes corresponding to geographical divisions of the business model hierarchy, the leaf nodes comprising one or more of the geographical indicators, and one or more of the aggregated geospatial elements are associated with one or more of the geographical divisions of the business model hierarchy and with one or more of the business transaction records.

8. The computer system of claim 1, wherein the program instructions for collecting the one or more geographical indicators comprise:
program instructions for searching one or more Business Intelligence data sources in the set of operational data for the geographical indicators.

9. The computer system of claim 1, wherein the set of logical rules comprise one or more logical rules executed by at least one of the one or more processors, via at least one of the one or more memories, to assign one or more additional geographical areas to a particular aggregated geospatial element from among the aggregated geospatial elements based on the one or more additional geographical areas being geographically between or proximate to geographical areas assigned to the particular aggregated geospatial element.

10. The computer system of claim 1, wherein the set of logical rules comprise one or more logical rules executed by at least one of the one or more processors, via at least one of the one or more memories, to assign one or more additional geographical areas to a particular aggregated geospatial element from among the aggregated geospatial elements based on balancing business data between different aggregated geospatial elements.

11. The computer system of claim 1, wherein the set of logical rules comprise one or more logical rules executed by at least one of the one or more processors, via at least one of the one or more memories, to generate the one or more aggregated geospatial elements based on both publicly available geographical areas and custom-defined geographical areas.

12. The computer system of claim 1, wherein the set of logical rules comprise one or more logical rules executed by at least one of the one or more processors, via at least one of the one or more memories, to detect that the additional unassigned geographical area has a greater summed proximity to a set of regions assigned to the selected aggregate geospatial elements than to other aggregated geospatial elements of the plurality of geospatial elements.

13. The computer system of claim 10, wherein balancing business data between different aggregated geospatial elements comprises balancing a number of transactions among regions assigned to each of the aggregated geospatial elements in the plurality of aggregated geospatial elements.

14. The computer system of claim 10, wherein balancing business data between different aggregated geospatial elements comprises balancing sales transaction volume among regions assigned to each of the aggregated geospatial elements in the plurality of aggregated geospatial elements based on past sales transactions collected from the set of operational data.

15. The computer system of claim 1, wherein the set of logical rules comprise one or more logical rules executed by at least one of the one or more processors, via at least one of the one or more memories, to:
search, for the additional unassigned geographical area, for direct matches, in a lookup table generated based on the collection of the geospatial data, to the geospatial data indicating one or more visually graphical geospatial shapes; and
search, for the additional unassigned geographical area, for indirect associations in an ontology corresponding to the geospatial data, at least by searching entity-relations or dimensional associations to match aliases.

16. A computer program product for creating geospatial elements based on geographical data, the computer program product comprising a non-transitory computer-readable storage medium having program code embodied therewith, the program code executable by a computing device to:
collect a set of operational data including one or more geographical indicators, the one or more geographical indicators indicating one or more geographical points and extended areas;
collect, from a set of geographical data, geospatial data associated with the one or more geographical points and extended areas indicated by the one or more geographical indicators, wherein the geospatial data indicates one or more visually graphical geospatial shapes that include the one or more geographical points and extended areas indicated by the one or more geographical indicators;

determine a relationship between the one or more geographical indicators and the one or more geographical points and extended areas;

generate, based on the one or more geographical indicators and the geospatial data, and further based on the relationship between the one or more geographical indicators and the one or more geographical points and extended areas, a plurality of aggregated geospatial elements, wherein each of the plurality of aggregated geospatial elements depict geographical areas comprising visually graphical shape outlines with aggregated boundaries defined by a subset of boundaries of the visually graphical geospatial shapes; and superpose one or more of the plurality of aggregated geospatial elements on a map image that is provided by a map application, wherein generating the one or more aggregated geospatial elements comprises assigning an additional unassigned geographical area to a selected aggregated geospatial element of the plurality of aggregated geospatial elements at least by executing a set of logical rules configured to select one of the aggregate geospatial elements to which to assign the additional unassigned geographical area based on a relative location of the additional unassigned geographical area to each of the aggregated geospatial elements in the plurality of aggregated geospatial elements, wherein the set of logical rules comprise one or more logical rules executed by the computing device to fill gaps with no data within the defined boundaries of the composite shapes.

17. The computer program product of claim 16, wherein a defined outer geographical boundary contains the one or more geographical points and extended areas indicated by the one or more geographical indicators, wherein the set of logical rules comprise one or more logical rules executed by at least one of the one or more processors, via at least one of the one or more memories, to:

assign one or more additional geographical areas contained within the outer geographical boundary to one of the aggregated geospatial elements; and assign the one or more additional geographical areas contained within the outer geographical boundary to one or more of the aggregated geospatial elements until all portions of area within the outer geographical boundary are assigned to one of the aggregated geospatial elements.

18. The computer program product of claim 16, wherein the set of logical rules comprise one or more logical rules executed by at least one of the one or more processors, via at least one of the one or more memories, to composite one or more of the additional geographical areas together with the one or more geographical points and extended areas indicated by the one or more geographical indicators using set union and intersection semantics.

19. A method, in a data processing system comprising at least one processor and at least one memory, the at least one memory comprising instructions executed by the at least one processor to configure the at least one processor to perform computer operations to perform the method, wherein the method comprises:

collecting a set of operational data including one or more geographical indicators, the one or more geographical indicators indicating one or more geographical points and extended areas;

collecting, from a set of geographical data, geospatial data associated with the one or more geographical points and extended areas indicated by the one or more geographical indicators, wherein the geospatial data indicates one or more visually graphical geospatial shapes that include the one or more geographical points and extended areas indicated by the one or more geographical indicators;

determining a relationship between the one or more geographical indicators and the one or more geographical points and extended areas;

generating, based on the one or more geographical indicators and the geospatial data, and further based on the relationship between the one or more geographical indicators and the one or more geographical points and extended areas, a plurality of aggregated geospatial elements, wherein each of the plurality of aggregated geospatial elements depict geographical areas comprising visually graphical shape outlines with aggregated boundaries defined by a subset of boundaries of the visually graphical geospatial shapes; and superposing one or more of the plurality of aggregated geospatial elements on a map image that is provided by a map application, wherein generating the one or more aggregated geospatial elements comprises assigning an additional unassigned geographical area to a selected aggregated geospatial element of the plurality of aggregated geospatial elements at least by executing a set of logical rules configured to select one of the aggregate geospatial elements to which to assign the additional unassigned geographical area based on a relative location of the additional unassigned geographical area to each of the aggregated geospatial elements in the plurality of aggregated geospatial elements, wherein the set of logical rules comprise one or more logical rules executed to fill gaps with no data within the defined boundaries of the composite shapes.

\* \* \* \* \*